June 14, 1927.
J. KOCH
1,632,341
FEED GRINDER
Filed Aug. 27, 1926
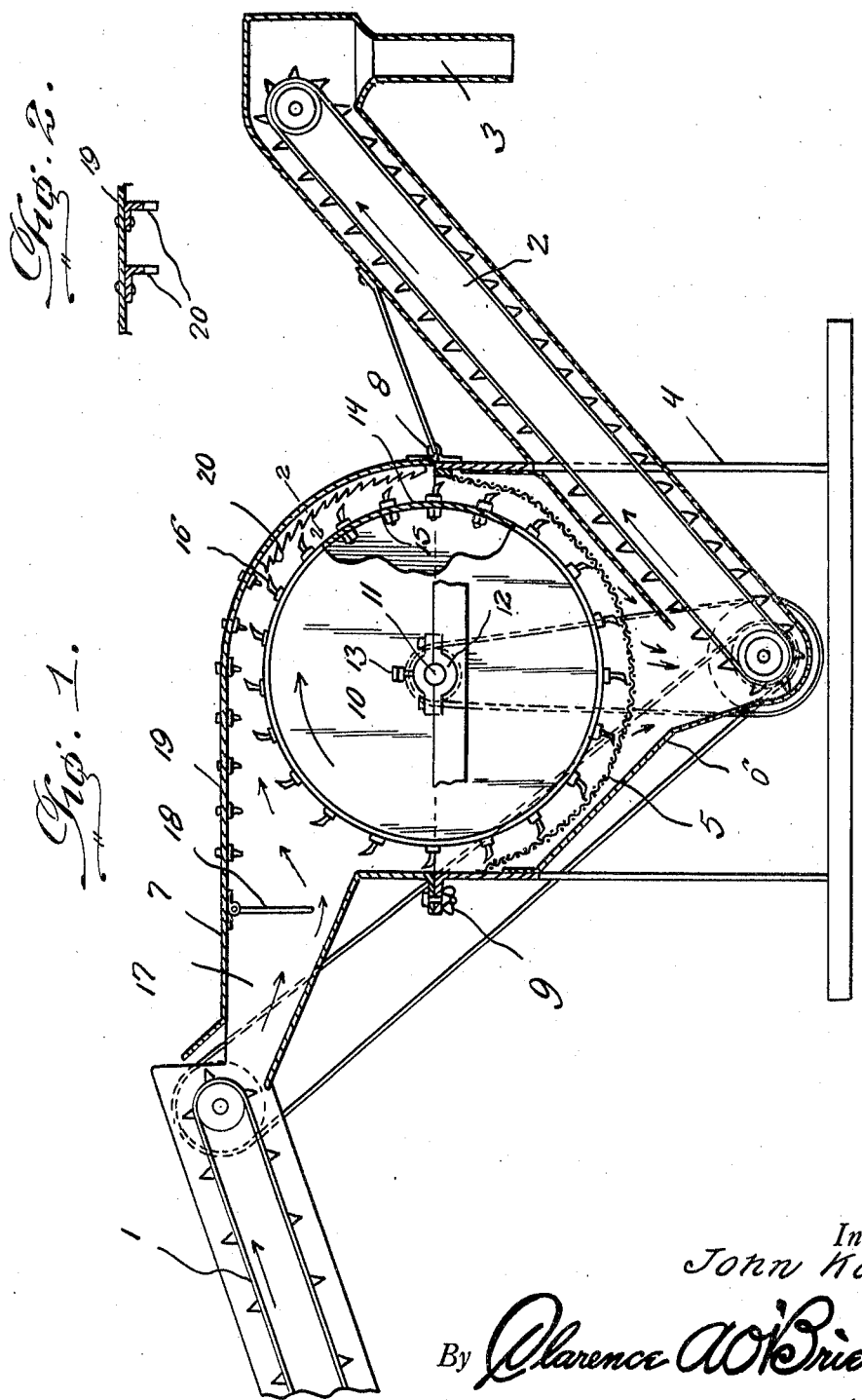
Inventor
John Koch,
By Clarence A O'Brien
Attorney Patented June 14, 1927.

UNITED STATES PATENT OFFICE.

JOHN KOCH, OF EUSTIS, NEBRASKA.

FEED GRINDER.

Application filed August 27, 1926. Serial No. 131,920.

The object of my present invention is the provision of a simple, durable and efficient apparatus for grinding snap, corn, ear corn, shelled corn, oats, wheat, corn fodder and different kinds of hay.

To the attainment of the foregoing the invention consists in the improvement as hereinafter described and definitely claimed.

In the accompanying drawing, forming part of this specification:—

Figure 1 is a view partly in longitudinal vertical section and partly in side elevation showing an embodiment of my invention which has been reduced to actual practice and successfully operated in this country.

Figure 2 is an enlarged fragmentary section on line 2—2 of Figure 1.

Similar numerals of reference designate corresponding parts in both figures of the drawing.

By reference to the drawing, my novel apparatus as illustrated will be understood as comprising an endless conveyor 1 for feeding stock to be ground, and an endless conveyor 2 for taking ground feed from the apparatus and delivering the same to a pendent spout 3, an appropriate main frame 4, a concave screen 5, preferably of reticulated material as illustrated, carried in the frame 4 and above a casing wall 6 and also above the lower portion of the conveyor 2, a hood section 7, hinged at 8, and designed to be detachably secured in working position at 9, and a cylinder 10 having journals 11, disposed in bearings 12 on the main frame 4, which bearings are preferably equipped with oil cups 13. The cylinder 10 is provided with an imperforate peripheral portion 14, and on the outer side of the said peripheral portion 14 are bars 15, equipped with hammers 16. The alternate bars 15 are provided with four spaced hammers 16, and the other bars 15 are provided with five spaced hammers 16, and in the preferred arrangement the hammers are disposed in staggered relation so that the hammers of the four series will be opposite the spaces of the hammers of the five series. The cylinder 10 is designed to be driven in the direction indicated by the curvilinear arrow in the drawing.

The hood section alluded to is provided with a throat portion 17, and disposed in said throat portion 17 is a pendent and swingable trap door 18, the function of which is to prevent retrograde movement of the grain in the throat 17 which is designed to serve after the manner of a hopper.

Carried by the top wall of the hood section 7 are spaced transverse bars 19. The hammer bearing cylinder is designed to be rotated at a high rate of speed, and it serves to throw the grain up against the cross bars 19, and the said cross bars 19 operate to retard the grain so that the hammers 16 strike the grain before the same passes to the saw teeth, the said saw teeth which are designated by 20 being carried by the forward curvilinear portion of the hood section top as illustrated. The said saw teeth 20 serve in practice to riddle and retard the grain so that the hammers 16 can operate again on the grain before the same passes through the screen 5.

It will be appreciated from the foregoing that in the operation of my novel grinder, the feed is at the back, and consequently the hammers 16 first catch the grain and throw the same upwardly against the cross bars 19, which cross bars retard the grain and bring about a backward movement of the same, so that the major portion of the grain is ground by the cooperation of the hammers 16 with the cross bars 19. It will also be understood that in the operation of my novel grinder the grinding hammers 16 run free and hence it is feasible to rotate the cylinder 10 at a high rate of speed. Manifestly in the event of choking taking place, the hood section 7 may be readily swung upwardly to afford access to the space between the cylinder and the hood section portion opposed to the cylinder, whereupon any congested mass may be expeditiously and easily removed.

Actual practice has demonstrated that my novel grinder is capable of grinding a large quantity of corn in a short period of time.

The screen concave 5 serves to support the grain until the grain is reduced to particles sufficiently fine to pass through the interstices of the screen, whereupon the particles will gravitate to the discharge conveyor 2 to be carried to the spout 3 or to any other desired point of discharge.

The saw teeth 20 are arranged in sets on curvilinear bars, one set of teeth to each bar as shown in the drawing, and the bars are spaced about one inch apart throughout the width of the top of the hood section 7, and so that the teeth do not come in contact with the hammers 16. The said bars carrying teeth 20 are suitably fixed to the said hood section top, Figure 2.

Having described my invention, what I claim and desire to secure by Letters-Patent, is:—

1. In a feed grinder and in combination, a casing, a concave having openings, supported in the casing, a throat or hopper leading to the casing and having its discharge portion disposed above one end of said concave, a cylinder mounted to be rotated in the casing and having spaced hammers on its perimeter, spaced cross bars carried by the top of the casing in front of the throat and extending downwardly from said casing top, and teeth carried by the casing top and arranged curvilinearly in front of the said spaced cross bars with reference to the direction of rotation of the cylinder; the peripheral portion of the cylinder being imperforate, and the space between the cylinder and the curvilinearly arranged teeth being of less width than the space between the cylinder and the transverse bars.

2. In a feed grinder and in combination, a casing, a concave having openings, supported in the casing, a throat or hopper leading to the casing and having its discharge portion disposed above one end of said concave, a cylinder mounted to be rotated in the casing and having spaced hammers on its perimeter, spaced cross bars carried by the top of the casing in front of the throat and extending downwardly from said casing top, and teeth carried by the casing top and arranged curvilinearly in front of the said spaced cross bars with reference to the direction of rotation of the cylinder; the peripheral portion of the cylinder being imperforate, the space between the cylinder and the curvilinearly arranged teeth being of less width than the space between the cylinder and the transverse bars, and the said throat or hopper being equipped therein with a pendent swingable door.

3. In a feed grinder and in combination, a casing body, a concave having openings, supported in said body, a superposed hood section hinged at one end to the casing body and detachably connected at its opposite end to said body and capable of swinging, the said hood section having a throat or hopper leading to the interior of the casing and also having on the inner side of its top, cross bars extending downwardly from said top and further having a forward curvilinear portion and teeth arranged curvilinearly at the inner side of said curvilinear portion and in front of the said spaced cross bars; a cylinder mounted to be rotated on and in the casing body and having spaced hammers on its perimeter and also having an imperforate perimeter, the space between the imperforate perimeter of the cylinder and the curvilinearly arranged teeth being of less width than the space between said perimeter and the cross bar.

In testimony whereof I affix my signature.

JOHN KOCH.